ns patented June 8, 1965

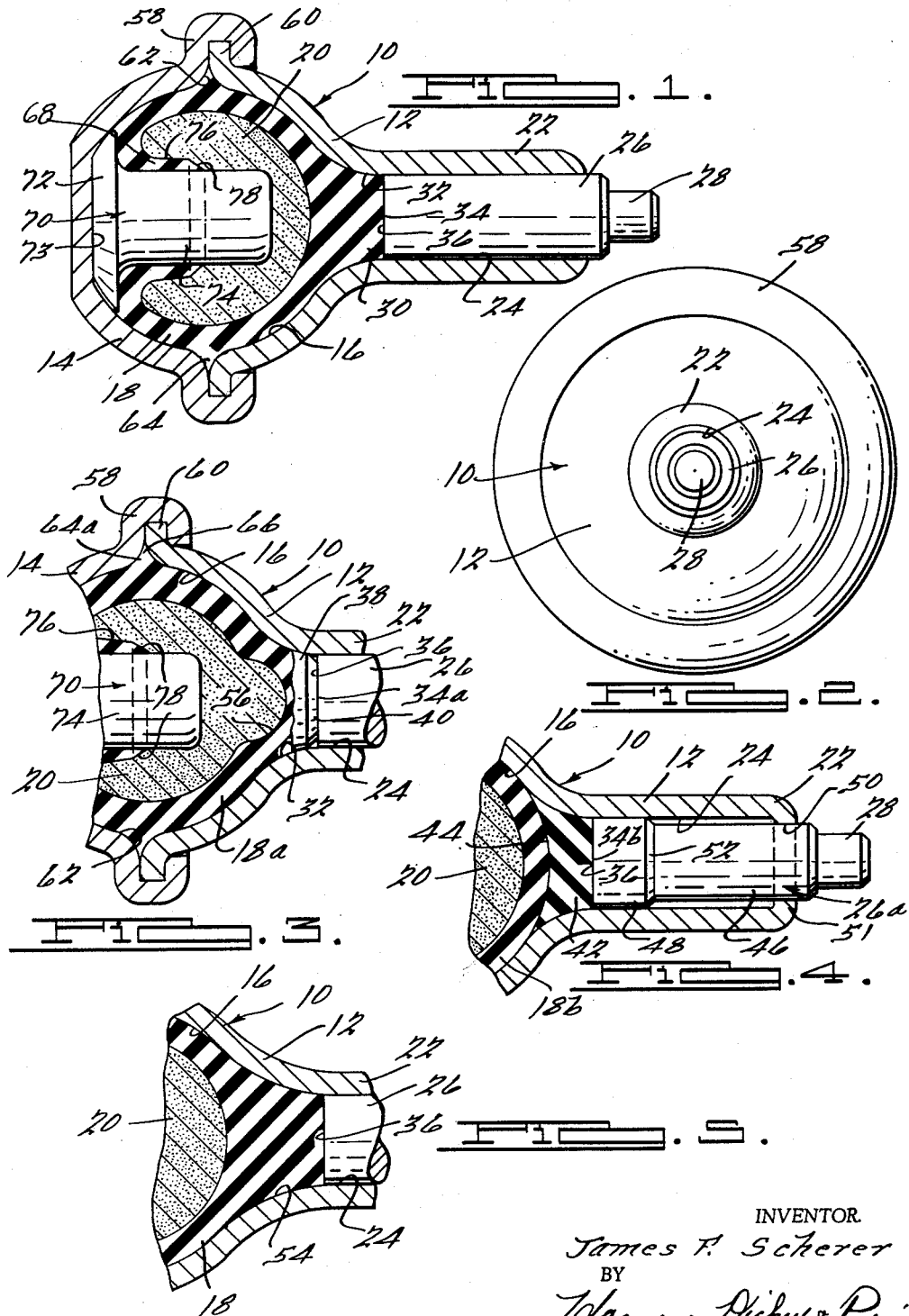

3,187,577
TEMPERATURE RESPONSIVE ACTUATOR
James F. Scherer, 206 Stanton Ave., Terrace Park, Ohio
Filed Aug. 20, 1962, Ser. No. 218,084
3 Claims. (Cl. 73—368.3)

The present invention broadly relates to control devices which are temperature responsive, and more particularly to an actuator device operative in responsive to a rise in temperature of a predetermined magnitude to produce a thrust of a considerable magnitude which is effective to actuate or otherwise communicate such condition to suitable control equipment connected thereto.

Temperature responsive actuators of the aforementioned type are in widespread use in industry for providing accurate and positive control of various processes and apparatuses in accordance with the surrounding thermal environment. Temperature responsive devices of this general type conventionally employ suitable heat expansible materials which are formulated so as to undergo a comparatively large controlled change in volume over a selected temperature range. The change in volume of the heat expansible material is transmitted through suitable flexible diaphragms to a movable member which in turn transmits a high thrust to equipment associated therewith.

There has been a continuing problem in the past of sealing the heat expansible material within the body or housing of a temperature responsive actuator device in view of the extremely high pressures that are conventionally developed. Any seepage of the heat expansible material from such a temperature responsive unit induces a lost motion operation therein which causes progressively greater deviations from its original calibrated actuating characteristics finally rendering the unit unsuitable for use.

In addition to the foregoing, repeated flexing of the resilient diaphragm member as occasioned during the operating life of a heat responsive actuator unit has in many instances occasioned premature failure of the unit by rupture or bursting of the diaphragm. Further problems have heretofore been encountered in connection with the manufacture and assembly of such temperature responsive units so as to assure an intergrally sealed actuator unit that is substantially completely filled with the heat expansible material and which is appropriately calibrated.

It is accordingly a primary object of the present invention to provide an improved temperature responsive actuator device which overcomes the disadvantages in the design, manufacture, assembly and operation of similar type devices heretofore known.

Another object of the present invention is to provide an improved temperature responsive actuator device which employes a self-contained resilient capsule in which a heat expansible material is disposed and to which heat is transferred through a metallic pin sealed in said capsule and disposed with the head portion thereof in thermal conducting contact with the surrounding housing.

Still another object of the present invention is to provide an improved temperature responsive actuator device which provides for an amplification of the movement of a piston in response to the expansion or contraction of the heat expansible material in the resilient capsule.

A further object of the present invention is to provide an improved thermal responsive actuator device which is of simple design, durable operation, accurate control and of economical manufacture.

Other objects and advantages of the present invention will become apparent from the following detailed description taken in conjunction with the accompanying drawings, wherein;

FIGURE 1 is a longitudinal sectional view through a temperature responsive actuator unit constructed in accordance with one of the embodiments of the present invention;

FIG. 2 is an end elevation view of the temperature responsive actuator unit shown in FIG. 1;

FIG. 3 is a fragmentary longitudinal sectional view of an alternate satisfactory construction of a resilient capsule from that shown in FIG. 1;

FIG. 4 is a fragmentary vertical sectional view of a temperature responsive actuator unit similar to that shown in FIG. 1 but employing a separate cushion and a tubular extension incorporating stop means thereon for regulating the maximum outward reciprocating movement of the piston; and FIG. 5 is a fragmentary longitudinal sectional view of still another satisfactory construction of a temperature responsive actuator unit incorporating therein an amplification section in the throat portion thereof for amplifying the reciprocatory movement of the piston in response to expansion and contraction of the heat expansible material contained in the resilient capsule.

Referring now in detail to the drawings and as may be best seen in FIG. 1, a temperature responsive actuator unit of the type comprising the present invention comprises a two-piece housing generally indicated at 10 including a flanged cup-shaped body 12 and a flanged cup-shaped retainer or cap 14 of a configuration such that on assembly thereof into an integral unit, a cavity or chamber 16 is formed in which a resilient capsule 18 is positioned. The body 12 and the cap 14 are preferably constructed of a high strength metal having a relatively high coefficient of thermal conductivity such as, for example, copper, aluminum, and brass in order to facilitate transmission of heat from the medium surrounding the housing to a heat expansible material 20 contained within the resilient capsule.

The heat expansible material 20 is the capsule 18 may comprise any suitable material which undergoes a relatively large change in volume over a selected temperature range and may include any material such as those disclosed in United States Patent No. 2,259,846, issued to Vernet et al. Heat expansible materials of this general type generally comprise waxes or blends of waxes which are formulated so as to achieve the desired volume change at any particular temperature level. The change in volume of such wax blends is primarily attributable to a change in volume of the transition of the material from a solid state to a liquid state and vice versa. The heat expansible materials may also incorporate heat conductive particles therein such as copper or other metallic fines, for example, which accelerate the transfer of heat through the material with a corresponding increase in the sensitivity of the actuator device to changes in the thermal environment.

The resilient capsule 18 is made of any suitable, substantially incompressible material such as natural or synthetic rubber, or other suitable synthetic plastic materials which are able to withstand repeated expansion and contraction as occasioned by the expansion and contraction of the heat expansible material contained therein. The resilient materials are further selected so as to be resistant to degradation from the elevated temperatures to which they are exposed and to be chemically resistant to the heat expansible material contained therein and any suitable lubricants applied to the walls of the chamber 16 to minimize friction during relative movement therebetween. For this purpose, a variety of natural and synthetic rubbers have been found particularly suitable providing excellent resiliency characteristics and stability against degradation and chemical attack.

The body 12 of the two-piece housing 10 is formed with a tubular extension 22 which is integrally connected thereto and is formed with a circular bore 24 along the outer end portion thereof of a substantially uniform cross section in which a piston 26 is slidably mounted. The outer end of the piston 26 may be suitably provided with a tang 28 which can be operatively connected to a control device which is effective to initate the appropate action in response to actuation thereof by the outward and inward reciprocatory movement of the piston. The actuated component of the control device is conventionally biased so as to urge the piston 26 to the fully retracted position. This inward biasing force is overcome by the pressure exerted by the heat expansible material when it attains a preselected temperature forcing the piston 26 outwardly.

Reciprocation of the piston 26 to and from a retracted position as shown in solid lines in FIG. 1 to a projected position shown in phantom, is achieved by the axial outward deflection of a cushion 30 integrally affixed to a substantially spherical wall of the resilient capsule 18 and disposed with its outer face 34 in abutting contact against the head or inner face 36 of the piston 26. The cushion 30 is positioned in a throat section 32 of the tubular extension 22 and is disposed in communication with the circular bore 24 at one end and the chamber 16 at the other end. In the particular construction of the cushion 30 shown in FIG. 1, the face 34 thereof positioned in contact with the face 36 of the piston is of a flat construction. An alternate satisfactory configuration of the cushion 30 is shown in FIG. 3 wherein a cushion 38 is integrally formed with the resilient capsule 18a and is provided with a chamfer 40 around the edges of a cushion face 34a. The chamfer 40 provides for a more gradual initial outward reciprocation of the piston 26 and also provides a small annular gap which can serve as a reservoir for a suitable lubricant for minimizing frictional resistance between the periphery of the piston 26 in the circular bore 24 and the periphery of the cushion 38 in the throat section 32.

Still another alternate satisfactory form of a cushion is shown in FIG. 4 wherein a separate cushion 42 is provided which is disposed with a face 34b in contact with the piston face 36 and an opposite face 44 thereof in abutting contact with the periphery of the substantially spherical wall of the resilient capsule 18b. The cushion 42 shown in FIG. 4 may also be provided with a chamfer similar to the chamfer 40 of the cushion 38 shown in FIG. 3.

It will also be noted in FIG. 4 that an alternate satisfactory form of the tubular extension 22 can be provided in which a piston 26a is slidably disposed having an outer section 46 thereof of a reduced diameter and an inner section 48 thereof of a diameter corresponding substantially to the diameter of the circular bore 24. The outer section 46 is slidably disposed within a bore 50 at the outer end of the tubular extension which may conveniently be formed by rolling in the outer edge thereof forming therewith an annular flange 51. A shoulder 52 defined by the intersection of the outer section 46 and inner section 48 of the piston 26a is adapted to coact with the turned-in flange 51 providing for a positive stop of the piston 26 regulating its maximum outward travel.

An alternate satisfactory construction of the throat section of the tubular extension 22 is shown in FIG. 5 wherein a throat section 54 is provided which is of a widely divergent or tapered configuration being of substantially greater cross section at a point contiguous to the resilient capsule 18 and progressively decreasing in cross section and forming a smooth transition with the circular bore 24 through the tubular extension. By virtue of this throat section 54 a unit linear outward movement of the cushion 30 produces a linear displacement of the piston 26 of a magnitude substantially greater than the linear movement of the diaphragmic wall of the capsule. During the outward movement of the piston, the cushion 30 and the wall of the resilient capsule are deformed and move outwardly in conformance with the wall defining portions of throat section 54 and the circular bore 24.

The incorporation of such an amplifying throat section provides for increased sensitivity and more rapid response in the movement of the piston 26 as a result of changes in the temperature of the heat expansible material 20 contained in the resilient capsule 18. Accordingly, by appropriately controlling the ratio of the cross-sectional area of the throat section 54 at the points adjacent to the wall of the resilient capsule and the face 36 of the piston, in addition to the selection of the appropriate blend of heat expansible material 20, the desired magnitude of actuation can be carefully controlled at any particular temperature level substantially enhancing the versatility and flexibility of the thermal responsive actuator unit.

Another alternate satisfactory construction of the resilient capsule is illustrated in FIG. 3 wherein the inner wall portion of the resilient capsule 18a is provided with a dimple or depression 56 disposed rearwardly of and substantially centrally of the integral cushion 38 which enhances the flexure characteristics of the cushion during expansion and contraction of the heat expansible material 20 in the capsule. The use of a depression 56 can also be satisfactorily employed in the cushion 30 as shown in FIG. 1 and may extend to a depth wherein the wall portions of the cushion correspond to a thickness no less than the wall portion of the resilient capsule.

As will be noted in FIG. 1, the body 12 and the cap 14 of the housing 10 are securely fastened to each other during assembly of the temperature responsive actuator device by rolling over a flange 58 on the cap 14 in tight overlying clamping relationship about an annular outwardly extending flange 60 on the body 12. The joinder of the mating faces of the flanges 58 and 60 form an annular V-shaped recess 62 extending around the interior of the chamber 16. The prevention of distortion and separation of this annular flange connection and improved seating characteristics of the resilient capsule is achieved by forming an annular V-shaped ridge 64 around the periphery of the resilient capsule 18 which is contoured to conform with the V-shaped recess 62 substantially completely filling the interior thereof. An alternate satisfactory V-shaped ridge 64a is incorporated in the resilient capsule 18a shown in FIG. 3 wherein the outer edge portion of a V-shaped ridge 64a is provided with a chamfer 66 extending completely therearound providing for a slight gap between the housing and resilient capsule which may conveniently serve as a reservoir for a suitable lubricant to reduce the frictional coaction between the periphery of the wall of the resilient capsule and the inner wall of the chamber 16.

The resilient capsule 18 as shown in FIG. 1 is provided with an inwardly extending sealing sleeve 68 which is integrally affixed to the wall portions thereof and in which a heat transfer pin 70 is sealingly disposed. The sealing sleeve 68 is positioned so that the longitudinal axis thereof is disposed in substantial alignment with the longitudinal axis of the tubular extension 22. The heat transfer pin 70 comprises a head portion 72 which is adapted to be seated in firm heat conducting contact with an appropriately contoured wall portion 73 of the cap 14 and serves to maintain the resilient capsule in appropriate alignment within the chamber 16. The contact of the head portion 72 with the housing provides a path for transmitting heat from the thermal environment surrounding the actuator device through the housing and thence through the heat transfer pin 70 to the heat expansible material 20 contained within the resilient capsule 18.

The shank portion 74 of the heat transfer pin 70 projects inwardly beyond the end of the sealing sleeve 68 and is disposed in thermal conducting contact with the heat expansible material therein. In view of the relatively high pressures developed within the resilient capsule during the expansion of the heat expansible material, good sealing characteristics must exist between the sealing sleeve and the shank portion of the heat transfer pin to prevent any leakage of the heat expansible material therefrom. This is achieved by providing the peripheral surface of the sealing sleeve with a multiple tapered configuration against which the pressure acts forming a more perfect seal between the sealing sleeve and peripheral surface of the pin as the pressure increases. In the specific arrangement shown in FIG. 1, the periphery of the sealing sleeve 68 is provided with an elongated tapered surface 76 extending for the major portion of the length thereof and a short chamfer or tapered surface at the end thereof forming a sealing lip 78 which, in response to circumferentially directed pressure thereagainst is effective to tightly clamp over the periphery of the heat transfer pin preventing any channeling of the heat expansible liquid therebetween. Conventionally, the diameter of the bore through the sealing sleeve is controlled to be slightly smaller than the diameter of the shank portion of the heat transfer pin to provide for a tight stretch fit which further enhances the sealing characteristics of the assembly.

The assembly of the temperature responsive actuator device shown in FIGS. 1–5 is extremely simple and may conveniently be accomplished by first filling the resilient capsule with the appropriate heat expansible material after which the heat transfer pin is inserted in the sealing sleeve providing a sealed unit. Thereafter, the assembled capsule can be inserted in the body 12 of the housing after which the cap 14 is placed thereover and the flange 58 rolled over forming an integral assembly. It is usually preferred to assemble the several component parts while immersed beneath the surface of a bath of lubricant such as, for example, a silicone oil to avoid entrapment of any air within the chamber of the housing and to provide filling of any slight depressions therein which thereafter act as lubricant reservoirs for minimizing friction. In thermal actuator units of the type shown in FIG. 4, the piston must first be inserted in the circular bore followed thereafter by the separate resilient cushion after which the resilient capsule is placed in the appropriate position and the cap secured to the body.

The temperature responsive actuator unit can be simply calibrated by allowing a predetermined gap between the face of the piston and the face of the cushion or by only filling the resilient capsule to a preselected level with the heat expansible material. In so doing, the desired degree of lost motion can be incorporated in the temperature responsive actuator unit whereby movement of the piston does not occur until the gaps provided have been filled during the expansion of the heat expansible material after which actuation commences.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A temperature responsive actuator comprising a housing formed with a chamber and a hollow extension disposed in communication with said chamber, said hollow extension comprising a first section having a bore therethrough of substantially uniform cross section and a second section having a throat therethrough disposed between and in communication with said bore and said chamber, a piston slidably mounted in said bore and reciprocable therein, a resilient capsule disposed in said chamber and containing a heat expansible material therein, said capsule including a resilient incompressible projection disposed in said second section and integrally connected to a wall portion of said capsule, said projection provided with a substantially planar face provided with a chamfer extending along the edge thereof and disposed in abutting relationship against the inner face of said piston, said capsule also including a sealing sleeve integrally connected thereto and extending inwardly and in alignment with the axis of said piston, the peripheral surface of said sealing sleeve formed with at least one tapered surface angularly inclined relative to the axis of said sleeve, and a heat transfer pin disposed in said sealing sleeve for sealing the heat expansible material therein and having the inner end thereof disposed in heat conducting contact with said heat expansible material and the outer end portion thereof in heat conducting contact with said housing.

2. A temperature responsive actuator comprising a housing formed with a chamber and a hollow extension disposed in communication with said chamber, said hollow extension comprising a first section having a bore therethrough of substantially uniform cross section and a second section having a throat therethrough disposed between and in communication with said bore and said chamber, a piston slidably mounted in said bore and reciprocable therein, a resilient capsule disposed in said chamber and containing a heat expansible material therein, a resilient incompressible cushion disposed in said second section having one face thereof disposed in abutting relationship against the periphery of said resilient capsule and the other face thereof provided with a planar configuration and formed with a chamfer along the edges thereof and disposed in abutting relationship against the inner face of said piston, said capsule further including a sealing sleeve integrally connected thereto and extending inwardly and in alignment with the axis of said piston, the peripheral surface of said sealing sleeve formed with at least one tapered surface angularly inclined relative to the axis of said sleeve, and a heat transfer pin disposed in said sealing sleeve for sealing the heat expansible material therein and having the inner end thereof disposed in heat conducting contact with said heat expansible material and the outer end portion thereof in heat conducting contact with said housing.

3. A temperature responsive actuator comprising a two-piece housing including a flanged cup-shaped cap and a flanged cup-shaped body member joined together at the mating flanged surfaces thereof defining therewith a chamber including a V-shaped groove extending around the interior thereof along the line of joinder of said cap and body member, said body member including a hollow extension comprising a first section having a bore therethrough of substantially uniform cross section and a second section having a throat therethrough disposed between and in communication with said bore and said chamber, a piston slidably mounted in said bore and reciprocable therein, a resilient capsule disposed in said chamber and containing a heat expansible material therein, said capsule including a resilient incompressible projection integrally connected to a wall portion of said capsule and disposed in said second section and provided with a substantially planar face having a chamfer extending along the edge thereof and disposed in abutting relationship against the inner face of said piston, a V-shaped ridge extending around the periphery of said capsule and integrally connected thereto and disposed in said V-shaped groove around the interior of said chamber, said capsule formed with a sealing sleeve integrally connected thereto and extending inwardly and in alignment with the axis of said piston, the peripheral surface of said sealing sleeve formed with at least one tapered surface angularly inclined relative to the axis of said sleeve, and a heat transfer pin disposed in said sealing sleeve for sealing the heat expansible material therein and having the inner end thereof disposed in heat conducting contact with said heat expansible material and the outer end portion thereof in heat conducting contact with said housing.

References Cited by the Examiner

UNITED STATES PATENTS

| | | | |
|---|---|---|---|
| 2,781,784 | 2/57 | Baker | 73—368.2 |
| 2,803,494 | 8/57 | Scherer | 73—368.3 |
| 2,810,290 | 10/57 | Scherer | 73—368.3 |
| 2,901,908 | 9/59 | Asakawa | 73—368.3 |
| 3,059,475 | 10/62 | Vernet | 73—368.3 |

ISAAC LISANN, *Primary Examiner.*

Notice of Adverse Decision in Interference

In Interference No. 95,228 involving Patent No. 3,187,577, J. F. Scherer, TEMPERATURE RESPONSIVE ACTUATOR, final judgment adverse to the patentee was rendered Apr. 26, 1968, as to claims 1, 2 and 3.

[*Official Gazette September 24, 1968.*]